United States Patent Office 3,214,847
Patented Nov. 2, 1965

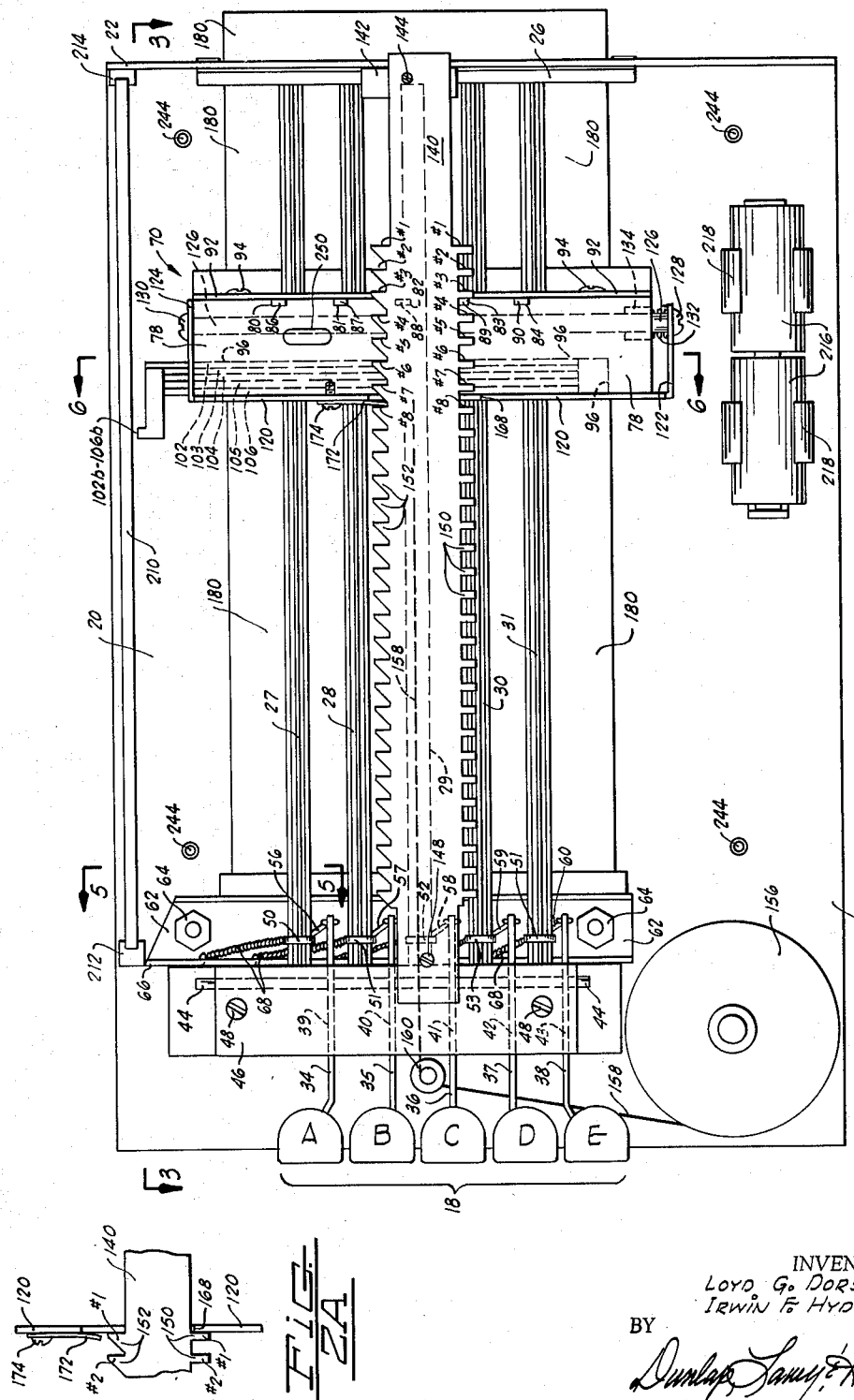

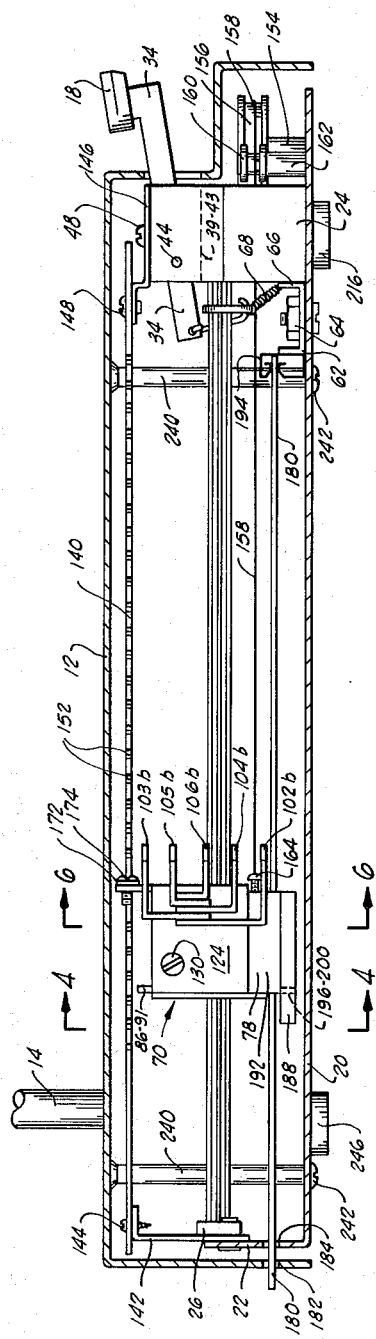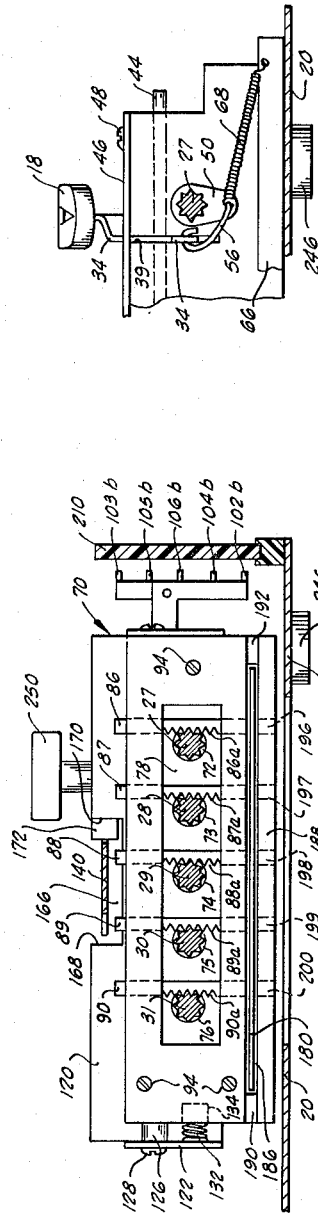

3,214,847
TEACHING AND TESTING AID
Loyd G. Dorsett, 601 Berry Road, Norman, Okla., and Irwin F. Hyden, 2133 Dominquez, Torrance, Calif.
Filed July 9, 1962, Ser. No. 208,194
8 Claims. (Cl. 35—9)

The present invention relates to education and more particularly, but not by way of limitation, relates to a teaching aid for instantaneously indicating to a student the correctness of the multiple choice answer selection which he has made and for simultaneously recording the student's selection by perforating a standard IBM punch card.

As a result of research in the general field of education, it is generally well accepted that a prime requisite in teaching is to capture and maintain each student's interest and attention throughout the period of instruction. One of the most effective methods of attaining attention is to continually demand response and participation from each of the individual students of a class. It is also known that the retention rate of a student can be greatly increased by continually asking questions in such a manner as to require an answer from the student, and then immediately after the student's selection, supplying the student with the correct answer if necessary. An additional motivation is induced if the student's answers can be recorded so as to base a grade for the course upon the answers. Heretofore neither of these techniques of teaching could be accomplished because no means have been available for communicating the correct answer solely to an individual student without also giving the correct answer to the other students in the class. Also, it has heretofore been highly impractical to test each of the students with any degree of regularity because it has been necessary for the instructor to hand grade each of the examinations. This is a time consuming task and if necessary for each class period, would so overburden the teacher as to eliminate proper preparation of the course materials.

Therefore it is contemplated by the present invention to provide a teaching aid which will instantaneously inform the student whether his selected answer to each of a series of multiple choice questions is correct, and which will simultaneously, if desired, record the student's selected answer to each of the questions on a standard IBM punch card. The punch card can then be graded and correlated with other examination scores by an electronic computer without further effort from the instructor in order to determine the grade on each day's tests and to establish the student's average grade for the course. More specifically, but certainly not by way of limitation, the present invention contemplates a teaching aid comprising generally a support for a standard punch card and a printed circuit board, the circuit board having a plurality of stations and a contact at each station for completing a circuit to a suitable visual indicator for indicating when a correct answer has been selected, and means movable relative to the circuit board and relative to the punch card for selectively completing a circuit to the correct answer contact and for perforating the punch card in accordance with the correct answer. Other more detailed structural aspects of the invention are hereafter disclosed in the specification and pointed out in the appended claims.

Accordingly, a very important object of the present invention is to increase the effectiveness of an instructor in the presentation of a course of instruction.

Another very important object of the present invention is to provide a teaching aid of the type described which may advantageously be used in connection with any examination consisting of a series of multiple choice questions.

Another important object of the present invention is to improve subject matter retention by the student.

Still another object of the present invention is to provide a teaching aid of the type described which requires the constant attention of the students.

Another object of the present invention is to provide a device of the type described which requires continuous response from each of the students.

Yet another object of the present invention is to provide a teaching aid of the type described which immediately indicates whether the answer selected by the student is right or wrong, and which provides a means by which the student can make additional selections until the correct answer is obtained.

Another object of the invention is to provide a device for recording the number of selections required to select the correct answer to each particular question.

Still another object of the present invention is to provide a teaching aid for recording a student's answers to a series of multiple choice questions in a form which is easily graded and from which the final term average can be automatically obtained from electronic computer.

Still another object of the present invention is to provide a teaching aid of the type described which will make it practical to administer a test during each period of instruction.

Yet another object of the present invention is to provide a teaching aid which will, during the course of an examination, provide the instructor with a general indication of the extent to which the class as a group is receiving and understanding the subject matter of the course, and which will immediately indicate generally areas of the subject matter in which the students are weakest.

Another object of the present invention is to provide a teaching aid of the type described which is reliable in operation and which can be economically manufactured.

Still another object of the present invention is to provide a device of the type described which will automatically, upon completion of the selection of the answers to one question, reposition itself for selection of the answer to the next question.

Many additional objects and advantages of the present invention will be evident to those skilled in the art from the following detailed description and drawings, wherein:

FIG. 2 is a plan view of the device of FIG. 1 with the housing removed to reveal the working parts thereof;

FIG. 2a is a partial view of FIG. 2 showing the mechanism for shifting the carriage from one station to the next in the intermediate position;

FIG. 3 is a sectional view taken substantially on lines 3—3 of FIG. 2;

FIG. 4 is a sectional view taken substantially on lines 4—4 of FIG. 3;

FIG. 5 is a partial sectional view taken substantially on lines 5—5 of FIG. 2;

Figure 1:
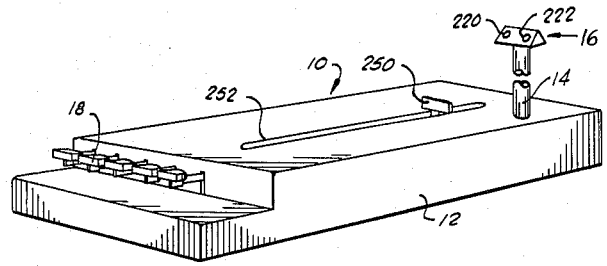
FIG. 1 is a perspective view of a teaching aid constructed in accordance with the present invention.

Referring now to the drawings, a teaching aid constructed in accordance with the present invention is indicated generally by the reference numeral 10, and has a housing 12 shaped generally as shown in FIG. 1. A tubular pedestal 14 is connected to the housing 12 and supports a visual answer indicator 16 in a position to be observed by both the student and the instructor for indicating whether the answer selected by the student is correct or incorrect. A plurality of keys 18 extend from the housing 12 so that the student may make a selection of an answer to a multiple choice question by pressing the key corresponding to the desired answer. It will be noted from FIG. 2 that five keys 18 are illustrated and are designated A–E to correspond to five answers to a multiple choice question having similar designations A–E.

The details of construction of the device 10 may be better understood by reference to FIGS. 2–6. The working mechanism of the device 10 is comprised of a base plate 20 which has an upturned flange portion 22 at the rear end thereof. A key block 24 is connected by any suitable means (not shown) to the base plate 20 adjacent the front end thereof, and is disposed generally parallel to the rear flange portion 22. A tail block 26 is connected by any suitable means to the upper end of the rear flange portion 22. Five gear rods 27, 28, 29, 30 and 31 are disposed in parallel relationship one to the other, and to the base plate 20, and are journaled at the opposite ends thereof in the key block 24 and the tail block 26 for rotational movement. The gear rods 27–31 may be fabricated in any suitable manner so as to be provided with a plurality of radially projected teeth, as best seen in FIGS. 4 and 5, which extend the entire length of each of the rods.

Five key levers 34, 35, 36, 37 and 38 are disposed in vertical slots 39, 40, 41, 42 and 43 (see dotted outline in FIG. 2) in the key block 24 and are pivotally supported by an axle 44 extending through the key block 24 and through each of the key levers. Of course the five key tabs 18, lettered A–E, are connected to the ends of the key levers 34–38, respectively. A key block cover plate 46 may be connected to the top of the key block 24 substantially as shown by screws 48. Lever arm plates 50, 51, 52, 53 and 54 are rigidly secured to the gear rods 27–31, respectively. Wirelike linkage members 56, 57, 58, 59 and 60 interconnect the ends of the key levers 34–38 and the lever arm plates 50–54, respectively, such that depression of any one of the keys will rotate the respective gear rod 27–31. An anchor plate 62 is connected by bolts 64 at the ends thereof to the base plate 20 and has an upturned flange portion 66, as best seen in FIG. 5. Five tension members, such as coil springs, represented collectively by the numeral 68, are connected to the lower ends of the lever arm plates 50–54 and anchored to the flange portion 66, as best seen in FIG. 5. The tension members 68 continually exert a bias on the lever arm plates 50–54 and therefore on the gear rods 27–31 and the key levers 34–38, tending to pull the ends of the key levers down and raise the respective keys, as will be evident from the drawings.

A carriage, indicated generally by the reference numeral 70, is slidingly disposed on the gear rods 27–31 which are received in five parallel bores 72, 73, 74, 75 and 76 (see FIG. 4), respectively, in the body 78 of the carriage 70. The body 78 may conveniently be fabricated from a block of plastic and is provided with five vertically disposed grooves 80, 81, 82, 83 and 84 in the rear edge thereof. The vertically disposed grooves 80–84 intercept the edges of the bores 72–76 and receive five elongated punch members 86, 87, 88, 89 and 90, respectively. The punch members 86–90 are provided with rack gears 86a, 87a, 88a, 89a and 90a, respectively, which mesh with the gear rods 27–31, respectively, such that the respective punch members will be reciprocated in the respective grooves upon rotation of the respective gear rods by depression of the respective keys, as hereafter described in greater detail. A rear retainer plate 92 is connected to the face of the body 78 by any suitable fastening means, such as screws 94 (see FIG. 4), to retain the punch members 86–90 in the grooves 80–84.

Figure 6:
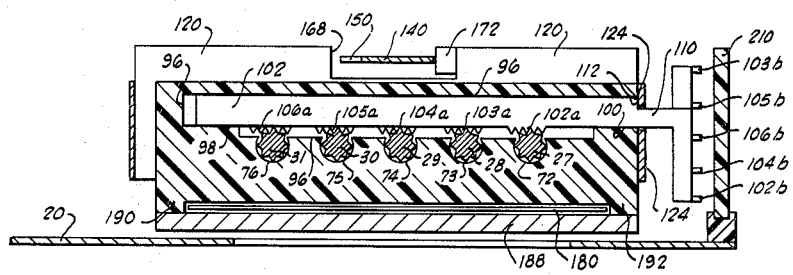
FIG. 6 is a sectional view taken substantially on lines 6—6 of FIG. 3.

A horizontally extending groove 96 is formed in the forward face of the carriage body 78, the extent of the groove being shown by dotted outline in FIG. 2 and by the interior outline of the cross hatching for the body 78 in FIG. 6. The groove 96 may have restricted portions 98 and 100 at the ends thereof to form bearing supports for five contact actuating slides 102, 103, 104, 105 and 106, as best seen in FIGS. 2 and 3. As can best be seen in FIG. 6, each of the contact actuating slides 102–106 is an elongated plate of constant width so as to be closely, but slidingly, received in the restricted bearing portions 98 and 100, of the groove 96. Each of the slide members is provided with a series of rack gears 102a, 103a, 104a, 105a and 106a which are so positioned as to mesh with the gear rods 27–31, respectively. Each of the contact actuating slides 102–106 is provided with a neck portion, designated collectively by the reference numeral 110, which form shoulders, indicated collectively by the reference numeral 112 in FIG. 6, on each of the contact actuating slides. Extensions of each of the neck portions 110 extend alternately downwardly and upwardly from the contact actuating slides 102–106, then forwardly and finally outwardly to form five vertically aligned, outwardly facing contacts 102b, 103b, 104b, 105b and 106b, as best seen by combined reference to FIGS. 3 and 6.

A yoke plate 120 is in abutting, sliding contact with the forward face of the carriage body 78 and has two end portions 122 and 124 which are bent at right angles and loosely bracket the opposite ends of the body 78. It will be noted by reference to FIGS. 2 and 6 that the yoke plate 120 is slightly longer than the carriage body 78 such that the end portion 122 is spaced from the body 78 when the end portion 124 abuts the other end of the body 78. An aperture (not referenced) is provided in the end portion 124 only sufficiently large to receive all the neck portions 110 of the several contact actuating slides 102–106 so that the shoulders 112 of each of the slides will abut against the end portion 124. A slide rod 126 extends through a suitable bore (not referenced) in the carriage body 78 and is connected to the end portions 122 and 124 by suitable fastening means such as screws 128 and 130. A coil spring 132 is positioned in a well 134 in the end of the carriage body 78 and continually exerts a bias against the end portion 122 tending to move the yoke plate 120 such that the end portion 124 will normally abut the end of the carriage body 78.

An elongated, platelike stationing bar 140 is connected by a suitable bracket 142 and screw 144 to the rear flange portion 22, and by a suitable bracket 146 and screw 148 (see FIG. 3) to the key block 24. One edge of the stationing bar 140 is provided with a plurality of uniformly spaced station hold tabs 150 and the other edge is provided with an equal number of correspondingly spaced station advance tabs 152, as best seen in FIG. 2. It will be noted that the station hold tabs 150 are generally rectangular while the forward edges of the station advance tabs 152 preferably are tapered to form generally right triangles, substantially as illustrated. A spring motor 154 (see FIG. 3) is mounted on the base plate 20 and drives a relatively large sheave 156 upon which a tension cable 158 is wound. The cable 158 passes around a sheave 160 which is mounted on a suitable support pedestal 162, which is connected to the base plate 20. The tension cable continues through a bore (not shown) in the key block 24, extends generally parallel to the gear rods 27–31 and is connected by a screw 164 to the carriage body 78. Therefore, the spring motor 154, through the tension cable 158, exerts a continuous force on the carriage 70 and continually urges the carriage 70 toward the key block 24, or from left to right when referring to FIG. 3. The top edge of the yoke plate 120 is provided with a slot 166 having side edges 168 and 170. A leaf spring 172 is connected to the yoke plate 120 by a screw 174. When uncompressed, the leaf spring 172 moves outwardly from the yoke plate 120 substantially as shown in FIG. 2a. The spring 172 serves to advance the carriage 70 from station to station upon release of the keys 18, as hereafter described in greater detail.

A standard IBM punch card 180 for use in a standard IBM computer is inserted through slots 182 and 184 in the rear wall of the housing 12 and the rear flange portion 22, respectively. A slot 186 in the carriage 70 for receiving the punch card 180 is formed between a die plate 188, spacer portions 190 and 192 of the carriage body 78, and the carriage body 78, as best seen in FIGS. 3 and 6. The forward end of the punch card 180 may be held in a suitable clip 194 which may be attached to the base plate 20 by any suitable means (not shown). The die plate 188 is provided with five die holes 196, 197, 198, 199 and 200, as shown in dotted outline in FIGS. 3 and 4. The die holes 196–200 have a configuration corresponding precisely with the configuration of the lower ends of the punch members 86–90 and are of a size to closely receive the ends of the punches. Therefore, upon lowering of the various punches into the respective dies by depression of the associated keys 18, the punch card 180 will be perforated in a manner to record the answer selection, as hereafter described in greater detail.

Figure 7:
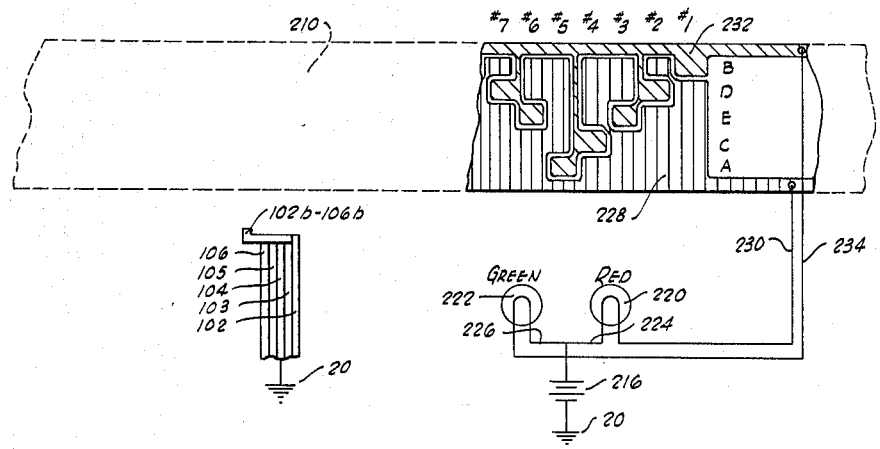
FIG. 7 is a somewhat schematic circuit diagram of the electrical circuitry of the device of FIG. 1.

A printed circuit contact board is indicated generally by the reference numeral 210. The contact board 210 is supported in generally parallel relationship to the gear rods 27–31 adjacent the contacts 102b–106b by suitable brackets 212 and 214 which may be connected to the anchor flange 66 and to the rear flange 22, for example, by any suitable fastening means (not shown). Two conventional flashlight batteries 216 may be fastened to the base plate 20 by suitable clamps 218 substantially as shown in FIG. 2. Red and green incandescent lamps 220 and 222, respectively, are housed in the indicator 16 and are visible from both sides. An electrical circuit for energizing the green indicator lamp 222 when the correct answer is selected, and for energizing the red indicator lamp 220 when the wrong answer is selected, is schematically illustrated in FIG. 7. One terminal of the batteries 216 is connected to ground, which may be the base plate 20 as indicated. The other terminal of the batteries is connected to one terminal of the red indicator lamp 220 by conductor 224, and to one terminal of the green indicator lamp 222 by conductor 226. The other terminal of the red indicator lamp 220 is connected to an incorrect answer terminal strip 228 on the printed circuit contact board 210 by a conductor 230. The other terminal of the green indicator lamp 222 is connected to a correct answer terminal strip 232 by a conductor 234. The printed circuit contact board 210 has a number of longitudinally spaced stations equal to the number of station hold tabs 150 and therefore equal to the number of station advance tabs 152. The first seven stations are illustrated by the station #1–#7 in the schematic diagram of FIG. 7. Each of the stations #1–#7 is so positioned as to be aligned with the contacts 102b–106b when the edge 168 of the yoke plate 120 is abutted against the station hold stops #1–#7, as designated in FIG. 2. At each of the stations on the printed circuit contact board 210 there are five transversely aligned contact areas which are aligned opposite the five contacts 102b–106b and are represented from top to bottom by the letters B, D, E, C, A. At each station, only one of the five contact areas is connected by electrically conductive material covering the printed circuit contact board 210 to the correct answer terminal strip 232, while the other four contact areas are connected by electrically conductive material to the incorrect answer terminal strip 228. For example, at station #1 contact area B is connected to the correct answer terminal strip 232, while the other four contact areas are connected to the incorrect answer terminal strip 228. At station #3 contact area E is connected to the correct answer terminal strip 232, while the other four contact areas are connected to the incorrect answer terminal strip 228. This same general scheme is randomly followed for each of the contact board stations which correspond in number to the number of station hold tabs 150 on the stationing bar 140.

The contacts 102b–106b are in electrical connection with the base plate 20 through the contact actuating slides 102–106, the metallic gear rods 27–31 and the metallic tail block 26, for example. Therefore, when any one of the contacts 102b–106b is moved against the printed circuit contact board 210 an electrical circuit will be completed either through the red indicator lamp 220 or through the green indicator lamp 222, depending upon whether the correct answer is selected, as hereafter described in greater detail. Of course it will be appreciated that the electrical conductors 224, 226, 230 and 234 will of necessity extend partially through the tubular pedestal 14 and within the housing 12 to be connected between the batteries 216, the indicator lamps 220 and 222 and the printed circuit contact board 210. However, for convenience, these conductors are not illustrated. The housing 12 may conveniently be connected to the base plate 20 by four spacer rods 240 and four screws 242 (only two of which are shown in FIG. 3) which may pass through each of the four apertures 244 shown in FIG. 2. Four resilient feet 246 may be attached to the bottom of the base plate 20 by any suitable means to prevent the metallic base plate from scratching a desk top.

Operation

In order to utilize the device 10 for instructional and evaluation purposes, a series of multiple choice type questions are first devised, each question having five answers designated consecutively by the letters A–E, and only one of which is correct. It is desirable that the five answers have an order of correctness such that one answer is absolutely correct, another is almost correct, another answer might be partially correct, etc. The correct answers to the several questions would then be arranged such that the answers to questions #1 through #7 would be B, D, E, C, A, E and D, respectively.

The carriage 70 is then positioned to the rear of the gear rods 27–31 with the spring 172 abutting station hold tab #1. If it is desired to record the student's choice of answers, the standard IBM punch card 180 is inserted through the slots 182, 184, 186 and into the clip 194. When the first question is presented to the student, either written on a sheet of paper, recited orally by the teacher, or flashed on a screen by a projector, the student makes his choice of the five answers by depressing the key 18 corresponding to the answer, the correct answer to question #1 being B. When the key designated B is pressed, the key lever 35 will pivot about the axle 44 to raise the linkage member 57 and rotate the gear rod 28 through the lever arm plate 51 against the bias of the corresponding spring 68. As the gear rod 28 is rotated, the punch member 89 will be moved downwardly in the groove 81 by the rack gear 87a which meshes with the teeth on the gear rod 28. The end of the punch member will perforate the punch card 180 prior to entering the die hole 197 in the conventional manner. The perforation in the punch card 180 will be at station #1 on the card and spaced transversely on the elongated card at B position. If desired, the punch card 180 may be marked such that the perforation may be visually graded.

Also as the gear rod 28 is rotated by depression of the key 18 designated B, the contact actuating slide 103, which has rack gears 103a in mesh with the gears of the read rod 28, will be moved to the right when referring to FIG. 6 such that the uppermost contact 103b will be moved into electrical contact with the contact area B at position #1 of the contact board 210. This will complete an electrical circuit from the batteries 216 through the green indicator lamp 222 to the correct answer terminal strip 232, to the contact area B, and through the contact 103b back to ground 20 and thereby illuminate the green indicator lamp 222. Illumination of the green indicator lamp will indicate to the student and to the teacher that the correct answer to question #1 was selected.

As the contact actuating slide 103 is moved to the right, when referring to FIG. 6, by rotation of the gear rod 28, the shoulder 112 of the slide 103 will also abut the end portion 124 of the yoke plate 120 and move the yoke plate 120 toward the printed circuit contact board 210. As the yoke plate 120 is moved in this manner, the side edge 168 will be moved into position to abut station hold tab #1 before the leaf spring 172 clears the station advance tab #1. Abutment of the side edge 168 against station hold tab #1 will prevent movement of the carriage 70 by the tension cable 158 until such time as all of the keys 18 are released. When the yoke plate 120 has been move sufficiently for the end of the leaf spring 172 to clear station advance tab #1, the spring will move out from the yoke plate 120 as illustrated in FIG. 2a. Upon release of the keys, the tension spring 68 will rotate the gear rod 28 back to its original position and also raise the key designated B, move the contact actuating slide 103 back into alignment with the other slides, and raise the punch member 86 from the card 180. As the slides move back into normal position, the spring 132 also moves the yoke plate 120 back to its original position. As the yoke plate 120 is moved back to its original position, the end of the leaf spring 172, which is bowed out as shown in FIG. 2a, enters the slot adjacent station advance tab #2. Then when the side edge 168 has cleared the station hold tab #1 the entire carriage will be moved by the tension cable 158 to station #2 at which point the leaf spring 172 will abut station advance tab #2. The device 10 will then by ready for the student to select an answer to question #2.

Assume now that the student selects an incorrect answer to question #2, such as answer E. Upon depression of the key designated E, gear rod 31 will be rotated, punch member 90 will be lowered to perforate the punch card 180 in position E at station #2, and contact 106b will be moved into contact with the contact area E of position #2 of the printed circuit contact board 210 by movement of the contact actuating slide 106 which has rack gears 106a inmesh with the gear rod 31. When contact 106b engages the contact area E of position #2, the red indicator lamp 220 will be illuminated through the circuit comprised of the batteries 216, conductor 224, the lamp 220, conductor 230, incorrect answer terminal strip 228, contact area E, contact 106b and back to ground. Upon seeing the red light, the student is immediately informed that he has selected an incorrect answer and accordingly continues to hold the incorrect key designated E depressed. It will be recalled that upon depression of any one of the keys 18, the shoulder 112 of the corresponding contact actuating slide moves the yoke plate 120 such that the side edge 168 abuts the corresponding station hold tab to prevent advancement of the carriage 70 until release of the key. Therefore, by holding the incorrect answer key depressed, the student can make a second or any number of additional choices required to find the correct answer and also light the green indicator lamp 222. Each additional selection will also be recorded in the proper transverse position on the punch card 180 at station #2, or any other station corresponding to the question. Therefore, the number of perforations in the card 180 for each station indicates the number of trys necessary for the student to select the correct answer. At the same time, the student is immediately informed of the correct answer to the question so that he receives the correct information at a time when his retention rate is at a maximum. Upon release of all of the keys, the yoke plate 120 will move back to its original position and the leaf spring 172 will enter the next successive slot such that the carriage 70 will then be moved by the tension cable 158 to the next successive station preparatory to selection of the answer to the next question. After the test has been completed, the carriage 70 can be moved back to station #1 preparatory to the next examination merely by placing a thumb against the reset tab 250 which is threaded into a suitable tapped bore in the carriage body 78 and extends through a longitudinally extending slot 252 in the housing 12. The leaf spring 172 will permit the carriage 70 to be moved rearwardly against the force of the tension cable 158 to position #1.

This procedure is repeated for each question of the examination. Upon completion of the examination, the punched IBM card 180 may be visually graded for immediate determination of the grade, and can be forwarded to a centrally located computer for automatic grading and storage of the information for automatic processing and computation of the student's average grade for all examinations completed and ultimately the final grade for the course. A single computer could easily handle cards from all the students in a city, even if an examination were given daily in each of several courses. The student's attention will be constantly retained so that the instruction will be far more effective. Each student is given the correct answer to each question before he proceeds to the next question such that a teaching process is accomplished during the test at a time when the rate of subject matter retention is at a maximum. The indicator lights 220 and 222 are preferably made visible to both the individual student and the instructor so that the instructor can get a general indication, by a glance around the room, of the questions which a relatively large number of students are answering incorrectly and can later emphasize or repeat that subject matter. The device described makes it practical for experts in the field to develop a standardized course of instruction for an entire school system. The course of instruction would have a vast number of instructive type questions, thereby freeing the individual instructors for concerted effort toward weaker students and the subject areas in which the class as a group is weak.

It will also be appreciated that the order of correct answers can very easily be altered merely by exchanging printed circuit contact boards, or the position of the printed circuit contact board may be shifted any number of times, both longitudinally and transversely to provide an extremely high number of random answer patterns. The structure is relatively simple and trouble free in operation and can be economically produced, yet performs the dual functions of indicating a correct answer to a number of questions and also recording the answers selected by a student. The position of the indicator lights on the pedestal 14 is such as to indicate to both the student and the instructor whether the correct answer has been selected. The device can easily be made self-powered and portable by batteries. The device is virtually foolproof in repositioning the carriage in preparation for the answer to the next question, yet permits a number of answer selections to each question until the correct answer is chosen.

Having thus described a particular embodiment of the invention, it is to be understood that various changes, substitutions and alternations can be made in the character and combination of the parts without departing from the spirit and scope of the invention as defined by the appended claims.

What is claimed is:

1. A teaching aid for giving an examination consisting of a plurality of multiple choice questions to a student, the teaching aid comprising:

support means for supporting a contact board and a punch card in generally parallel relationship, the contact board having a plurality of stations spaced therealong and at least one correct answer contact at each station;

indicator circuit means connected to the correct answer contacts for producing a discernable signal upon completion of an electrical circuit through one of the correct answer contacts; and, carriage means movable relative to the contact board and to the punch card and positionable at the stations, the carriage means having a plurality of manually actuated means thereon for simultaneously perforating the punch card for producing a record of the student's answers to each question, and for completing a circuit through the correct answer contact of the station at which the carriage is positioned when the manually actuated means corresponding to the correct answer to a question is actuated to produce a discernable signal and indicate that a correct answer has been selected.

2. A teaching aid comprising:
a contact board having a plurality of stations at spaced points therealong, each station having a plurality of contact areas and at least one correct answer contact in one of the areas, and at least one incorrect answer contact in said one area;
indicator circuit means connected to the correct answer contacts and in correct answer contacts for producing a discernable indication of correctness or incorrectness upon closing of the indicator circuit through any one of said answer contacts;
carriage means movable relative to the contact board and positionable at each of the stations, the carriage means having a plurality of movable contacts each disposed adjacent the contact areas of the station at which the carriage may be positioned; and,
means for selectively moving each of the movable contacts into engagement with the corresponding contact area while retaining said carriage stationary relative to said contact board for closing the indicator circuit means when one of the movable contacts engages the answer contact to indicate the selection of an answer.

3. A teaching aid as defined in claim 2, wherein:
the contact board is a printed circuit board.

4. A teaching aid for selectively punching an electronic computer card to record a student's choice of answers to a test consisting of a plurality of multiple choice questions, the device comprising:
a frame;
a plurality of elongated gear rods disposed in parallel relationship and rotatably connected to the frame for rotation about the longitudinal axes thereof;
key means for selectively rotating each of the gear rods;
card holding means connected to the frame for holding a card in parallel relationship to the elongated gear rods;
a carriage slidable longitudinally along the gear rods;
a plurality of punch means carried by the carriage, each punch means being actuated by rotation of one of the gear rods for perforating a card held by the card holding means; and,
means for moving the carriage a predetermined distance along the gear rods after the punch means have been selectively actuated in answer to each question of the test.

5. A teaching aid for selectively punching an electronic computer card to record a student's choice of answers to a test consisting of a plurality of multiple choice questions, the device comprising:
a frame;
a plurality of elongated gear rods disposed in parallel relationship and rotatably connected to the frame for rotation about the longitudinal axes thereof;
key means for selectively rotating each of the gear rods;
card holding means connected to the frame for holding a card in parallel relationship to the elongated gear rods;
a carriage slidable longitudinally along the gear rods;
a plurality of punch means carried by the carriage, each punch means being actuated by rotation of one of the gear rods for perforating a card held by the card holding means;
means for successively moving the carriage to a plurality of preselected positions along the gear rods after the punch means have been selectively actuated in answer to each question of the test;
at least one set of electrical contacts for each of the preselected positions of the carriage;
switch means connected to each of the gear rods for closing the set of electrical contacts when the key corresponding to the correct answer is actuated; and,
indicator means actuated upon closing of the electrical contacts for indicating when the correct key has been actuated.

6. A teaching aid for selectively punching an electronic computer card to record a student's choice of answers to a test consisting of a plurality of multiple choice questions, the device comprising:
a frame;
a plurality of elongated gear rods disposed in parallel relationship and rotatably connected to the frame for rotation about the longitudinal axes thereof;
a plurality of key means for selectively rotating each of the gear rods;
card holding means connected to the frame for holding a card in parallel relationship to the elongated gear rods;
a carriage slidable longitudinally along the gear rods;
a plurality of punch means carried by the carriage, each punch means comprising an elongated member having a punch at one end and a rack gear along one side, each of the elongated members being disposed generally perpendicular to the gear rods with the rack gear meshing with one of the gear rods and being movable longitudinally by rotation of the gear rods to punch a card held by the card holding means;
a die-plate connected to the carriage and movable therewith, the die-plate being disposed on the opposite side of a card held by the card holding means from the punch means and having an aperture for receiving each of the punches; and,
means for selectively moving the carriage to a plurality of preselected positions along the gear rods after the punch means have been selectively actuated in answer to each question of the test.

7. A teaching aid for selectively punching an electronic computer card to record a student's choice of answers to a test consisting of a plurality of multiple choice questions as defined in claim 6 and further characterized by:
a plurality of elongated switch members carried by the carriage for longitudinal movement generally perpendicular to the gear rods, each of the switch members having a rack gear meshing with a different gear rod whereby rotation of any one gear rod will move only one of the switch members, and having a contact bridging portion at one end thereof;
at least one pair of contacts suported by the frame for each position of the carriage along the gear rods, the contacts being disposed in alignment with the switch member which is moved by rotation of the gear rod corresponding to the correct answer to a question such that the bridging portion of the switch member will complete an electrical circuit through the contacts; and,
indicator means actuated upon closing of the electrical contacts for indicating when the correct key has been actuated.

8. A teaching aid for selectively punching an electronic computor card to record a student's choice of answers to a test consisting of a plurality of multiple choice questions as defined in claim 7 wherein the means for selectively moving the carriage to a plurality of preselected positions along the gear rods after the punch means have been selectively actuated in answer to each question of the test is comprised of:
spring means urging the carriage from one end of the gear rods to the other;

an elongated stop member affixed to the frame and extending parallel to the gear rods, the stop member having a plurality of pairs of stops disposed on opposite sides of the stop member at longitudinally spaced points therealong;

a bar stop slidingly supported by the carriage and movable therewith for movement transversely of the elongated stop member;

means for moving the bar stop transversely between first and second positions of the stop member upon actuation of any one of the switch members; and, means on the bar stop for engaging one stop of each pair of stops upon actuation of any key to hold the carriage in position and for releasing the carriage for movement by the spring means upon release of the key, and for engaging one of the next successive pair of stops to stop the carriage.

References Cited by the Examiner

UNITED STATES PATENTS

| | | | |
|---|---|---|---|
| 824,208 | 6/06 | Rothermundt | 83—560 |
| 1,298,400 | 3/19 | Reynolds | 234—20 |
| 1,742,216 | 1/30 | Rauber | 83—533 |
| 1,772,186 | 8/30 | Lee et al. | 234—20 |
| 2,052,442 | 8/36 | Black | 35—48 |
| 2,102,577 | 12/37 | Cleven | 35—48 XR |
| 2,311,055 | 2/43 | Kopas | 35—9 |
| 2,756,822 | 7/56 | Jones | 83—553 |
| 2,965,975 | 12/60 | Briggs | 35—9 |
| 3,057,082 | 10/62 | Wellington et al. | 35—9 |
| 3,095,653 | 7/63 | Corrigan | 35—9 |

JEROME SCHNALL, *Primary Examiner.*

LEO SMILOW, LAWRENCE CHARLES, *Examiners.*